United States Patent [19]

Lazay

[11] 4,236,904

[45] Dec. 2, 1980

[54] METHOD FOR MONITORING OPTICAL FIBER DRAWING

[75] Inventor: Paul D. Lazay, New Providence, N.J.

[73] Assignee: Bell Telephone Laboratories, Incorporated, Murray Hill, N.J.

[21] Appl. No.: 47,640

[22] Filed: Jun. 11, 1979

[51] Int. Cl.[3] ............................................. C03B 37/02
[52] U.S. Cl. ..................................... 65/2; 65/11 W; 65/13; 65/29; 356/432
[58] Field of Search ...................... 65/2, 11 W, 13, 29, 65/158; 356/201

[56] References Cited

U.S. PATENT DOCUMENTS

| | | | |
|---|---|---|---|
| 4,021,217 | 5/1977 | Bondybey et al. | 65/13 |
| 4,081,258 | 3/1978 | Goell et al. | 65/29 X |

OTHER PUBLICATIONS

IBM Technical Disclosure, vol. 14, #11, Apr. 1942, Mancini, pp. 3294–3295.
Applied Optics, vol. 16, #9, Sep. 1977, Barnoski et al., pp. 2375–2379.
Applied Optics, vol. 15, #9, Sep. 1976, Barnoski et al., pp. 2112–2115.
Bell System Technical Journal, vol. 56, #3, Personick, Mar. 1977, pp. 355–366.
Technishes Messen Atm V 3713–3715, Hillerich, 1976, pp. 269,270.

Primary Examiner—Robert L. Lindsay, Jr.
Attorney, Agent, or Firm—Peter V. D. Wilde

[57] ABSTRACT

Local transmission loss of optical fibers can be measured in "real time" with the disclosed non-destructive technique. Similarly, the technique allows determination of the presence and location of structural defects. It can be used to monitor the fiber drawing process, to adjust the process in response to the information derived by use of the technique, and to monitor and adjust the cabling process. It is based on the launching of light pulses into the fiber through the reservoir of material from which the fiber is being drawn, and the analysis of the light scattered back through the fiber and the reservoir. The back-scattered light is detected, and the time elapsed between launching of the light pulse and detecting light is used to determine the location of the scatterer.

9 Claims, 2 Drawing Figures

U.S. Patent     Dec. 2, 1980     4,236,904

METHOD FOR MONITORING OPTICAL FIBER DRAWING

BACKGROUND OF THE INVENTION

1. Field of the Invention

This invention is in the field of methods for the production of optical fiber, particularly in the field of methods for monitoring the drawing and coating of such fiber.

2. Description of the Prior Art

Optical fiber is currently generally produced by drawing from a reservoir of fluid glass, such as the hot end of a rod, often called a preform, or from a crucible. Process control in practice has been generally limited. Most commonly, only the fiber diameter is monitored, and kept constant by adjusting drawing speed and, in specialized cases, the temperature of the hot zone. A method does exist, however, for detecting the presence and location of physical defects in optical fibers simultaneously with the drawing of the fiber. In this method, disclosed in U.S. Pat. No. 4,021,217, the scattering of light directed at the fiber approximately perpendicularly to the fiber axis is detected, the scattered light signaling a defect. The prior art also contains a method for detecting localized defects in bundles of optical fibers, by directing light axially into the bundle and observing the light leakage from the bundle (R. H. Mancini, *IBM Technical Disclosure Bulletin*, Vol. 14, No. 11, 3294 (1972)). This method is said to be adaptable to the inspection of single fibers during drawing, and thus would provide the same information as the technique disclosed in U.S. Pat. No. 4,021,217. Both these techniques rely on the observation of the spatial location of the source of scattered light for determining the presence and location of localized defects in the fiber.

Such a crucial fiber characteristic as transmission loss per unit length, however, can only be determined after drawing has been completed, since such a measurement requires access to one or both ends of the fiber. One of the methods that is used for making such a loss measurement, and which, in addition, also yields information as to the presence and location of physical defects in the fiber, is optical time domain reflectometry (OTDR). In OTDR short pulses of light are directed onto one end of the fiber user test, and consequently these pulses travel through the fiber away from the launching end. A small part of the light in the pulses is scattered from the ever-present statistical fluctuations of the refractive index of the fiber material, so-called Rayleigh scattering. Some light also is scattered by localized physical defects as well as by the far end of the fiber. Part of this scattered light is guided back through the fiber and exists through the launching end. This light is then detected, generally by means that convert the optical signal to a corresponding electrical one, which, after processing, can, for instance, be displayed on the screen of an oscilloscope as a trace of intensity of backscattered light vs. time elapsed since launching of the pulse. Because the speed of light in the fiber is known, this trace is equivalent to one of intensity vs. distance travelled in the fiber. Since the amount of light scattered at any point in the fiber is strictly proportional to the light intensity at that point and the scattering power of the fiber at that point, the backscattered light can be used to measure the optical power at each point in the fiber, and thus the rate of decay of the optical power in the pulse can be measured. This, however, is just the transmission loss of the fiber. A discussion of the theory underlying this measurement technique can be found for instance in M. K. Barnoski et al., "Optical Time Domain Reflectometer," *Applied Optics*, Vol. 16, 2375 (1977).

In summary then, the relevant prior art contains a method for measuring the local transmission loss, including the presence and location of structural defects, in optical fibers which have at least one end available such that light can be coupled there into and out of the fiber. This means that the method can be used only after completion of the drawing process. The prior art also contains methods for detecting the presence and location of structural defects in the fiber as the fiber is being drawn. But no method exists that allows the determination of both transmission loss and the presence and location of defects during the process of drawing the fiber.

SUMMARY OF THE INVENTION

The invention is a technique and associated apparatus for determining the local transmission loss of an optical fiber, as well as the presence and location of structural defects in the fiber, in "real time, " i.e., during the process of drawing the fiber. The technique is nondestructive, compatible with existing manufacturing methods, and lends itself to a continuous monitoring of the different steps of the drawing process. It is based on the launching of light pulses into the fiber through the reservoir of transparent fluid material from which the fiber is being drawn, and the analysis of the light scattered back through the fiber and the reservoir. Here "fluid material" refers to material in a state that permits the drawing of fiber. For instance, if the fiber is to be drawn from a glass preform then "fluid" typically implies that at least part of the perform is heated to a temperature above the softening temperature of glass. But herein the term is not so limited, and refers also to such other possible systems as polymer material in solvent or as a melt.

In this application we intend "defect" to mean any region in the fiber that results in light being scattered back. Thus the term does not only include localized scatterers such as cracks or inclusions but also the statistical fluctuations in the index of refraction that result in Rayleigh scattering. We also intend the phrase "location of the defect" or equivalent expressions to mean the length of fiber between the reservoir and the scattering region under discussion. For concreteness, the discussion from here on will be in terms appropriate to the drawing of glass fiber from a preform, but of course the scope of the invention is not so limited.

According to the invention, it is possible to direct light pulses into the preform in such a way that a significant fraction of the total radiant energy couples into the fiber through the neck formed as the fiber is being drawn from the preform. These pulses then travel through the fiber away from the neck. Part of the radiant energy will be scattered and guided by the fiber back to the preform, where it exits and is detected. It is possible to detect the scattered light despite the presence of the thermal radiation from the region of fluid glass by, for instance, using filters and signal averaging techniques. However, other ways of detecting the signal are possible and will be familiar to those skilled in the art. A useful way to display the information contained in the detected scattered light is as intensity detected vs. time elapsed since launching of the pulse.

From the slope of the smooth parts of such a curve the local transmission loss per unit length can be determined. Peaks or other sharp changes in the curve indicate localized scattering such as structural defects.

It is possible to realize the invention with spatial resolution of the order of 2 cm. Such a system allows continuous real time monitoring of the loss associated with each separate step in the fiber drawing process. Since these steps are generally performed simultaneously but at different parts of the fiber, typically separated by distances of the order of centimeters to meters, this allows real time adjustment of all of the process variables to minimize fiber loss.

A further possible application of the invention is to the monitoring of the cabling process of optical fiber, i.e., the process whereby a plurality of finished fibers are assembled into a cable. It is well known that this process results in a significant proportion of damaged fibers, which, however, at present can be identified only after completion of the cabling process. By running fiber drawing and cabling simultaneously in an integrated fashion, it is possible to monitor the cabling not only for such destructive faults as breaks in the fiber but also for, for instance, increased transmission loss due to microbending. Such information would be useful for optimizing the cabling process. It would for instance be possible to run a plurality of fiber drawing stations simultaneously, each feeding at least one fiber directly to the cabling station. Each one of these drawing stations could be provided with its own OTDR set-up in accordance with the invention. On the other hand, one could provide for an arrangment whereby a single OTDR set-up is used, in conjunction with appropriate optical apparatus, to intermittently monitor the drawing and cabling of a plurality of fibers. Other variations of this basic scheme are possible and will be apparent to those skilled in the art. When used in this fashion, OTDR eliminates the need for two separate measurement steps, one after completion of the drawing process, which is needed for checking the quality of the fiber, and one after completion of the cabling process, needed for detecting fibers damaged during cabling, and replaces them with a measurement carried out simultaneously with these two production steps, thus resulting in significantly increased efficiency in the production of optical cable.

DETAILED DESCRIPTION

Figure 1:
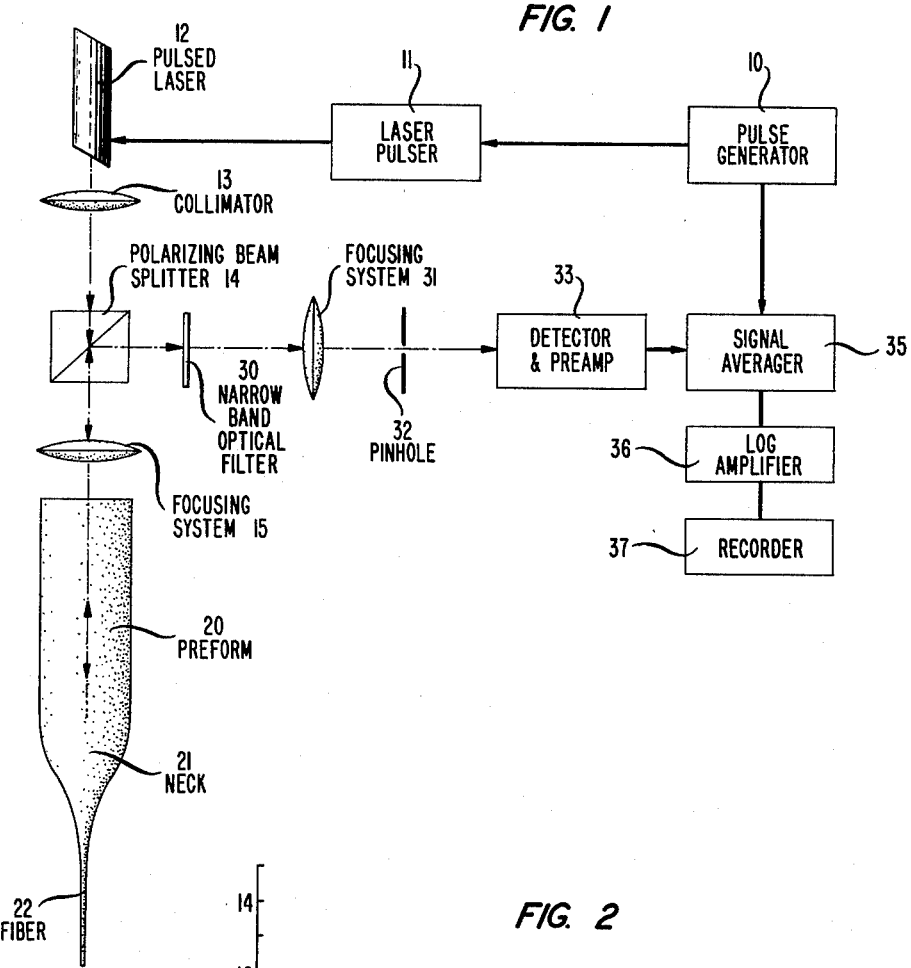
FIG. 1 is a schematic diagram of an apparatus for monitoring fiber drawing from a preform in accordance with the invention.

FIG. 1 shows a particular way of implementing the instant invention when the fiber is being drawn from a preform, i.e., from a glass rod having the same chemical composition and refractive index profile as is required of the fiber. Other schemes are possible, and some slight and obvious modifications for instance would adapt this scheme to fiber drawing from a crucible. And, of course, many different approaches are possible to signal acquisition, conditioning, and display, which would be familiar to one skilled in measurement techniques.

Pulse generator 10 produces electrical pulses at a predetermined rate, which pulses serve to trigger laser pulser 11. This pulser generates electrical pulses that are capable of driving laser 12. Other light sources could be use instead of laser 12, and this choice would determine the nature of pulser 11. One possible source would be a plasma arc. When used in conjunction with the appropriate optical instrumentation, this source permits the monitoring of local transmission loss at wavelengths of special interest for which no useful monochromatic sources are currently available. Such a wavelength could be, for instance, 1.4 $\mu$m, which would permit the monitoring of OH concentration as a function of position along the fiber. The light pulses from the laser are collimated in collimator 13, pass through the polarizing beam splitter 14, and are focused by the focusing system 15 onto the surface of preform 20. Another possible arrangement would be the drawing of a short fiber from the "upper" end of the preform, i.e., from the end remote from the neck 21 in FIG. 1, and the focusing of the light pulses onto the end of this short fiber. This variant eliminates the need for preparation of the "upper" surface, including polishing, which may be needed when coupling the light pulses directly into the preform. If the optical system is aligned correctly, the light will travel substantially along the axis of the preform towards the neck region 21, i.e., that part of the preform that is being heated and from which the fiber 22 is being drawn. Some of the light may be scattered out of the pulse after being incident on the side surface of the preform in the neck region, but a substantial part of the light will couple into the fiber and be transmitted through the fiber away from the preform. As the pulse is being guided through the fiber, part of the light will be scattered by microscopic variations in the index of refraction, by physical discontinuities such as inclusions or cracks, as well as by other mechanisms. The scattering will be discussed in more detail below. A fraction of the scattered light will suffer backscattering, resulting in a small amount of light from the pulse being guided back through the fiber towards the preform. This light traverses the preform substantially along its axis, and exits from the same surface through which the pulse had entered. After passing again through the focusing system 15, the light is polarized and deflected by polarizing beam splitter 14, passes through the narrow band optical filter 30 to focusing system 31, which is adapted to focusing parallel axial rays onto pinhole 32. The light that passes through the pinhole then enters detector 33. The polarizing beam splitter 14 serves to substantially prevent light scattered from the pulse by the various surfaces of the optical system and the preform from reaching the detector. Pinhole 32 serves the same function, since it is arranged such that substantially only light entering the focusing system 15 parallel to its optical axis can pass through the pinhole and into the detector. The function of the narrow band optical filter 30 is the limiting of the amount of thermal radiation from the hot neck region of the preform that reaches the detector. Since such radiation constitutes noise it is advantageous to choose a filter with a passband only as wide as is needed to pass the signal. The detector 33 produces an electrical signal substantially proportional to the amount of light that reaches the detector. A photodiode could serve as detector, but many other possibilities exist. After amplifying the electrical signal it is fed to signal averager 35, the output of which is amplified by log amplifier 36 and recorded by recorder 37. It will be appreciated that many other approaches to signal conditioning are possible. For instance, the logarithmic amplifier is used merely for the sake of convenience, since it serves to linearize the exponential portions of the loss curve.

Figure 2:
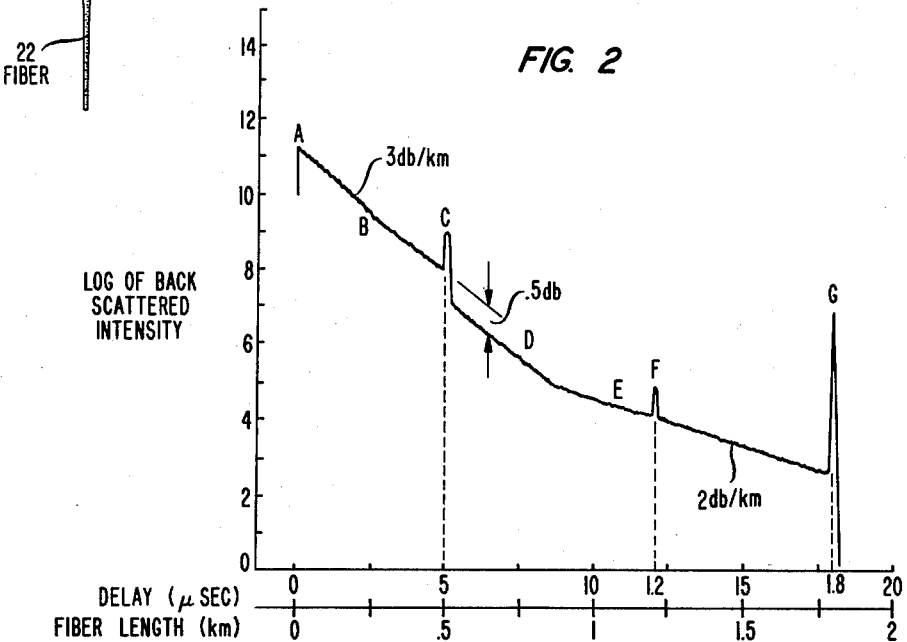
FIG. 2 is an idealized representation of output as it could be obtained with apparatus as shown in FIG. 1, with characteristics of the trace identified by the letters A through G.

A useful form of displaying the measurement results is as the logarithm of the backscattered intensity versus the time delay between pulsing of the laser and the detection of the backscattered light, as is shown in FIG. 2. The time delay of course is related to the propagation distance of the light in the fiber, and thus the location of any scattering center can be determined. For instance, in FIG. 2 we have assumed that the fiber measured has an effective index of refraction of 1.50. This means for instance that light that is detected 5 microseconds after the initial laser pulse was scattered from a region of the fiber that is 500 meters from the neck. Curves similar to the curve shown in FIG. 2 can be expected to result when the measurement is carried out with a system of moderate time resolution, for instance, with one employing pulses of pulse width of the order of 100 nanoseconds. If it is desired to monitor the details of the drawing process a system of higher time resolution would be required. For instance, a system using light pulses of 100 picoseconds width, together with a detection system of commensurate speed, would result in spatial resolution of the order of 2 centimeters. The information of greatest significance in such a monitoring system would be in the initial part of the curve of scattered intensity, the part labelled A in FIG. 2, which of course would then be displayed with a greatly expanded time scale.

In FIG. 2, the portion of the curve labelled B is substantially a straight line, with slope of about 3 dB/km, indicating that for about 900 meters the fiber has a uniform loss coefficient of about 3 dB/km. The peak labelled C indicates that about 500 meters from the preform there is a localized defect in the fiber. This could, for instance, be a bubble or other inclusion, or a crack in the fiber. It will be noticed that section D of the curve is set off by a finite amount from section B, although both sections have the same slope. In FIG. 2, this set-off is about $-0.5$ dB. This indicates that the defect responsible for peak C causes a loss of this magnitude. The section of the curve labelled E is also a straight line, but has a slope of only about 2 dB/km, indicating a loss coefficient of 2 dB/km for the fiber from about 900 meters to 1800 meters from the preform. Such a change in loss coefficient along the fiber indicates either some change in manufacturing condition during the drawing of the fiber, or a non-uniformity of the preform. The peak labelled F indicates the presence of another localized defect about 1200 meters from the preform. No off-set of the curve is associated with this peak, therefore, this defect does not result in a significant loss of light. Peak G is due to reflection from the end of the fiber, thus serving as a convenient indicator of fiber length during drawing.

In the experimental apparatus constructed to illustrate this measurement technique, the light source was a semiconductor diode laser (Laser Diode Labs., LD-65), the pulser a dual pulse width laser-pulser (Power Technology, Inc., Model IL20C—10/100-P-8-DN), and the polarizing beam splitter a calcite prism (K. Lambrecht Corp., Cat. No. MGLS-DW-12). Furthermore, the detector used was a Si avalanche photodiode with amplifier (RCA Electrooptics, Model C3081 8E) and the signal averager a boxcar averager (PAR Model 162 mainframe, with 2 Model 164 gated integrator modules). A Hewlett-Packard Model 7563A log amplifier was also used. This apparatus has a spatial resolution of the order of 10 m, a signal to noise ratio of at least 1000:1, and is capable of detecting localized defects as well as measuring the local loss coefficient.

Although in the discussion so far I have used the term "light" this does not imply a limitation on my invention. In its true scope the invention encompasses the use of electromagnetic energy of any wavelength at which the fiber material, in both the fluid and the non-fluid (i.e. solid) state, is transparent to that energy, and at which the fiber acts as a waveguide. "Transparent" I use here in the following way: if electromagnetic energy of a particular wavelength is coupled into a system, and if a significant fraction of the energy input, after traversing the system, is avialable as output, then such a system I call "transparent" at that wavelength. The electromagnetic energy range that is currently preferred for the practice of my invention, however, is the visible range together with the adjacent part of the infrared.

I claim:

1. A method for drawing optical fiber comprising drawing the fiber from a reservoir of material, the method CHARACTERIZED BY the steps of: launching pulses of electromagnetic energy to which the material and the fiber are transparent into the reservoir to couple the pulses into the drawn fiber, resulting in pulses travelling through the fiber away from the reservoir; and detecting electromagnetic energy scattered back through the fiber and the reservoir.

2. The method of claim 1, in which the time elapsed between the time of launching of a pulse of electromagnetic energy and the time at which the electromagnetic energy is detected is measured.

3. The method of claim 2, in which the measured elapsed time is used to determine the location of a defect.

4. The method of claim 3, in which the drawing process is adjusted in response to the detected electromagnetic energy.

5. The method of claim 3, in which the cabling process is adjusted in response to the detected electromagnetic energy.

6. The method of claim 3, in which both the drawing process and the cabling process are adjusted in response to the detected electromagnetic energy.

7. The method of claim 1, in which a laser is the source of the pulses of electromagnetic energy.

8. The method of claim 1, in which a pulsed plasma discharge tube is the source of the pulses of electromagnetic energy.

9. The method of claim 1, in which a light emitting diode is the source of the pulses of electromagnetic energy.

* * * * *